(12) United States Patent
Chen et al.

(10) Patent No.: US 12,032,618 B2
(45) Date of Patent: Jul. 9, 2024

(54) SYSTEM AND METHOD TO INFER THOUGHTS AND A PROCESS THROUGH WHICH A HUMAN GENERATED LABELS FOR A CODING SCHEME

(71) Applicant: TOYOTA RESEARCH INSTITUTE, INC., Los Altos, CA (US)

(72) Inventors: Yin-Ying Chen, San Jose, CA (US); Shabnam Hakimi, San Francisco, CA (US); Kenton Michael Lyons, Los Altos, CA (US); Yanxia Zhang, Foster City, CA (US); Matthew Kyung-Soo Hong, Mountain View, CA (US); Totte Harinen, San Francisco, CA (US); Monica PhuongThao Van, Palo Alto, CA (US); Charlene Wu, San Francisco, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 2 days.

(21) Appl. No.: 17/970,162

(22) Filed: Oct. 20, 2022

(65) Prior Publication Data
US 2024/0134898 A1 Apr. 25, 2024

(51) Int. Cl.
*G06F 16/38* (2019.01)
*G06F 16/35* (2019.01)

(52) U.S. Cl.
CPC .............. *G06F 16/38* (2019.01); *G06F 16/35* (2019.01)

(58) Field of Classification Search
CPC .................................. G06F 16/38; G06F 16/35
See application file for complete search history.

(56) References Cited

U.S. PATENT DOCUMENTS

| 2007/0180503 | A1* | 8/2007 | Li ........................... H04L 67/02 726/5 |
| 2019/0042894 | A1 | 2/2019 | Anderson |
| 2021/0056588 | A1 | 2/2021 | Kim |
| 2021/0280171 | A1 | 9/2021 | Phatak et al. |

FOREIGN PATENT DOCUMENTS

| CN | 110378824 A | 10/2019 |
| CN | 112818811 A | 5/2021 |
| KR | 20190111643 A | 10/2019 |

* cited by examiner

*Primary Examiner* — Baoquoc N To
(74) *Attorney, Agent, or Firm* — SEYFARTH SHAW LLP

(57) ABSTRACT

A method for inferring intent and discrepancies in a label coding scheme is described. The method includes compiling data indicating how one or more individuals labeled unstructured content according to the label coding scheme comprising a plurality of labels. The method also includes analyzing a context associated with a content labeled in a particular manner by the one or more individuals. The method further includes detecting discrepancies of meaning for a particular label used by the one or more individuals. The method also includes inferring a strategic thinking of the one or more individuals associated with the discrepancies of meaning detected for the particular label. The method further includes displaying recorded metadata associated with the strategic thinking and the discrepancies of meaning detected for the particular label between the one or more individuals regarding a coded dataset.

20 Claims, 5 Drawing Sheets

SYSTEM AND METHOD TO INFER THOUGHTS AND A PROCESS THROUGH WHICH A HUMAN GENERATED LABELS FOR A CODING SCHEME

BACKGROUND

Field

Certain aspects of the present disclosure generally relate to machine learning and, more particularly, to a system for inferring thoughts and a process through which a human generated labels for a coding scheme.

Background

Coding unstructured content (e.g., text, images, etc.) with labels is used in many different applications, and is a vital part for qualitative data analysis. Coding unstructured content generally involves humans for naming objects in images, identifying sounds in audio clips, detecting activities in video clips, and the like. Unfortunately, such conventional techniques are severely limited in that they ignore a great deal of human behavior and other such variables, such as uncertainties of human conduct, preferences, biases, and the like. In particular, relying on humans in the loop for coding results in the definitions of labels, which by their nature are very subjective. A large part of the subjectiveness is due to the differences of how people interpret the context based on their biases, expectations, etc., and how people take that in their thinking process.

During dataset coding, the user may have certain assumptions regarding the labels they use. Such deficiencies may carry over into machine learning models trained using the labeled data, rendering these machine learning models deficient. A system for inferring thoughts and a process through which humans generated labels for a coding scheme is desired.

SUMMARY

A method for inferring intent and discrepancies in a label coding scheme is described. The method includes compiling data indicating how one or more individuals labeled unstructured content according to the label coding scheme comprising a plurality of labels. The method also includes analyzing a context associated with a content labeled in a particular manner by the one or more individuals. The method further includes detecting discrepancies of meaning for a particular label used by the one or more individuals. The method also includes inferring a strategic thinking of the one or more individuals associated with the discrepancies of meaning detected for the particular label. The method further includes displaying recorded metadata associated with the strategic thinking and the discrepancies of meaning detected for the particular label between the one or more individuals regarding a coded dataset.

A non-transitory computer-readable medium having program code recorded thereon for inferring intent and discrepancies in a label coding scheme is described. The program code is executed by a processor. The non-transitory computer-readable medium includes program code to compile data indicating how one or more individuals labeled unstructured content according to the label coding scheme comprising a plurality of labels. The non-transitory computer-readable medium also includes program code to analyze a context associated with a content labeled in a particular manner by the one or more individuals. The non-transitory computer-readable medium further includes program code to detect the discrepancies of meaning for a particular label used by the one or more individuals. The non-transitory computer-readable medium also includes program code to infer a strategic thinking of the one or more individuals associated with the discrepancies of meaning detected for the particular label. The non-transitory computer-readable medium further includes program code to display recorded metadata associated with the strategic thinking and the discrepancies of meaning detected for the particular label between the one or more individuals regarding a coded dataset.

A system for inferring intent and discrepancies in a label coding scheme is described. The system includes a dataset coding interface module to compile data indicating how one or more individuals labeled unstructured content according to the label coding scheme comprising a plurality of labels. The system also includes a context analysis model to analyze a context associated with content labeled in a particular manner by the one or more individuals. The system further includes a label discrepancy model to detect the discrepancies of meaning for a particular label used by the one or more individuals. The system also includes a strategic thinking inference model to infer a strategic thinking of the one or more individuals associated with the discrepancies of meaning detected for the particular label. The system further includes a dataset metadata display module to display recorded metadata associated with the strategic thinking and the discrepancies of meaning detected for the particular label between the one or more individuals.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
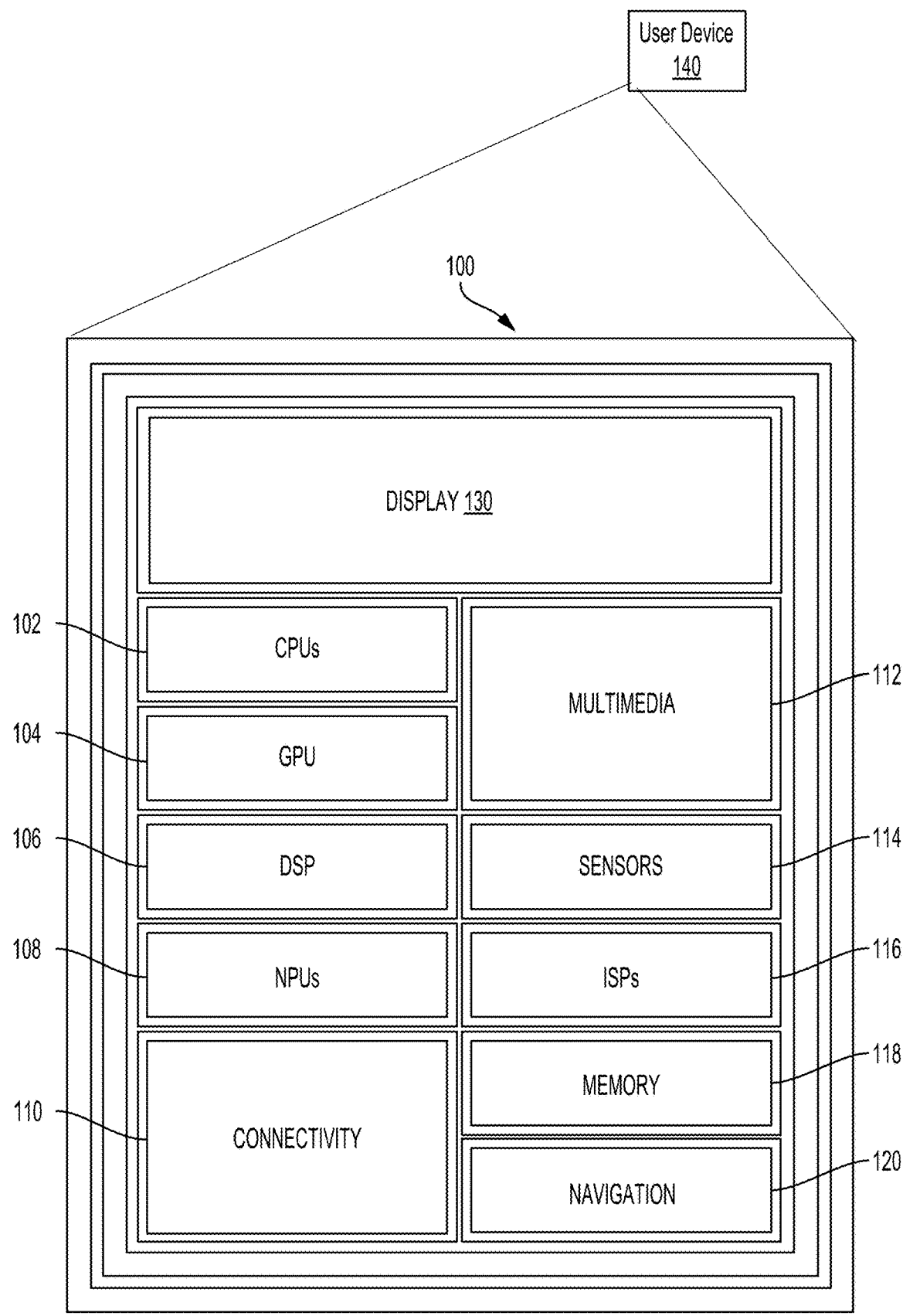
FIG. 1 illustrates an example implementation of designing a neural network using a system-on-a-chip (SOC) for inferring intent and label definition discrepancy in a dataset coding system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Coding unstructured content (e.g., text, images, etc.) with labels is used in many different applications, and is a vital part for qualitative data analysis. Coding unstructured content generally involves humans for naming objects in images, identifying sounds in audio clips, detecting activities in video clips, and the like. Unfortunately, such conventional techniques are severely limited in that they ignore a great deal of human behavior and other such variables, such as uncertainties of human conduct, preferences, biases, and the like. In particular, relying on humans in the loop for coding results in the definitions of labels, which by their nature are very subjective. A large part of the subjectiveness is due to the differences of how people interpret the context based on their biases, expectations, etc., and how people take that in their thinking process.

Unfortunately, during dataset coding, the user may have certain assumptions regarding the labels they use. Such deficiencies may carry over into machine learning models trained using the labeled data, rendering these machine learning models deficient. A system for inferring thoughts and a process through which humans generated labels for a coding scheme is desired.

Some aspects of the present disclosure are directed to utilizing machine learning to identify definitions of a label given by different individuals and the contextual factors that influence the labeling. In some aspects of the present disclosure, identifying label definitions and contextual factors is performed by analyzing the context in which the labels appear, and to predict the strategic thinking of the individuals that created the label. In these aspects of the present disclosure, a system may analyze content associated with a label (e.g., words for text content or pixels for image content). The system may measure a discrepancy of meanings for a label used by different individuals or by the same individual on different passes through the data. The system may also record metadata associated with how an individual labeled content (e.g., reaction time to assign a label, or whether a label was changed). In some aspects of the present disclosure, the dataset is recoded based on the recorded metadata.

FIG. 1 illustrates an example implementation of the aforementioned system and method for inferring intent and label definition discrepancy in a dataset coding system using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., CPU 102) or the NPU 108 of the user device 140 may include code to infer intent of a label coding scheme. The instructions loaded into a processor (e.g., CPU 102) may also include code to receive data indicating how one or more individuals labeled unstructured content according to the label coding scheme comprising a plurality of labels. The instructions loaded into a processor (e.g., CPU 102) may also include code to analyze a context associated with content labeled in a particular manner by the one or more individuals. The instructions loaded into a processor (e.g., CPU 102) may also include code to detect discrepancies of meaning for a particular label used by the one or more individuals. The instructions loaded into a processor (e.g., CPU 102) may also include code to infer a strategic thinking of the one or more individuals associated with discrepancies of meaning detected for the particular label. The instructions loaded into a processor (e.g., CPU 102) may also include code to display recorded metadata associated with the strategic thinking and discrepancies of meaning detected for the particular label between the one or more individuals.

Figure 2:
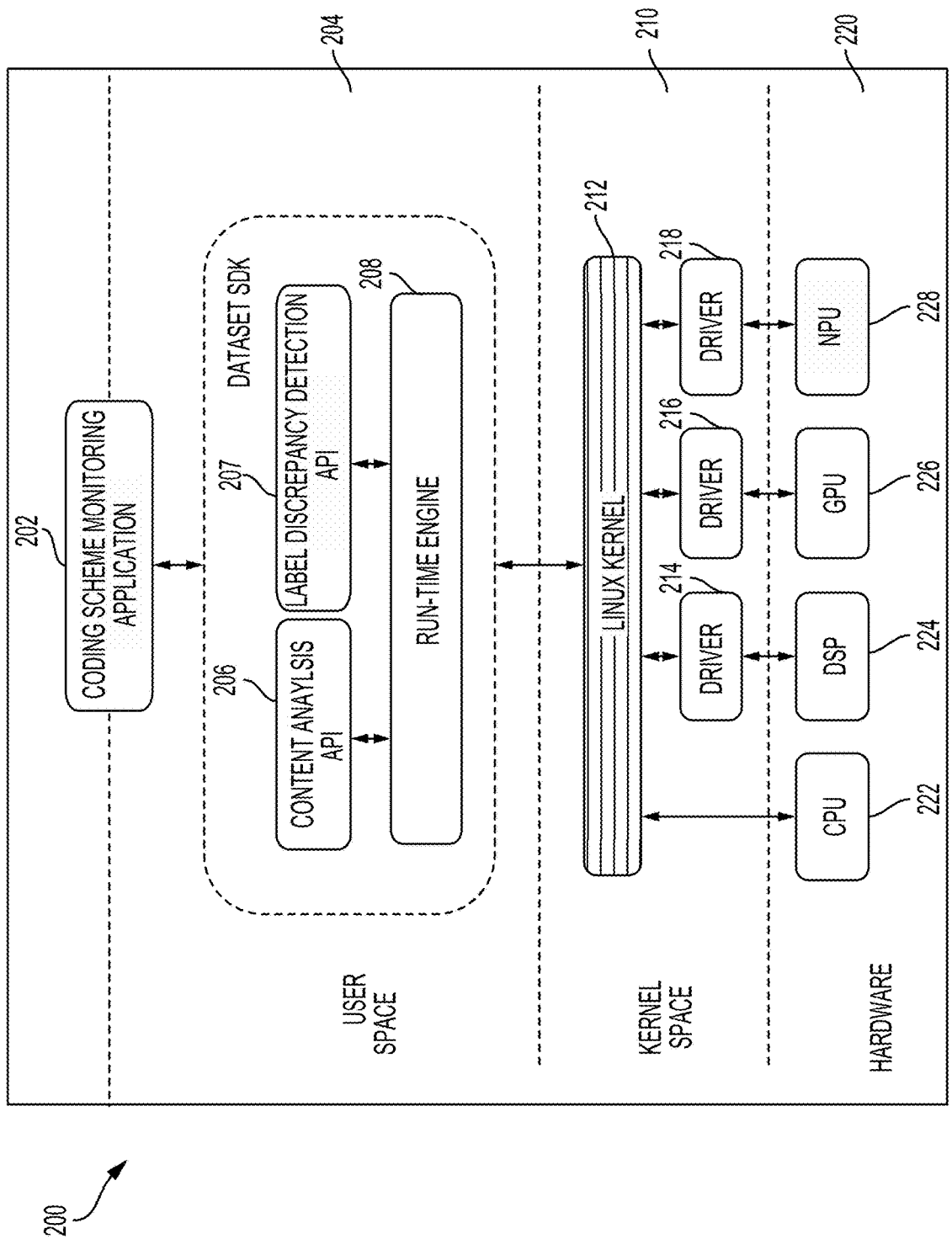
FIG. 2 is a block diagram illustrating an exemplary software architecture that may modularize artificial intelligence (AI) functions for inferring intent and label definition discrepancy in a dataset coding system, according to aspects of the present disclosure.

FIG. 2 is a block diagram illustrating a software architecture 200 that may modularize artificial intelligence (AI) functions for inferring intent and label definition discrepancy in a dataset coding system, according to aspects of the present disclosure. Using the architecture, a coding scheme monitoring application 202 may be designed such that it may cause various processing blocks of an SOC 220 (for example a CPU 222, a DSP 224, a GPU 226, and/or an NPU 228) to perform supporting computations during run-time operation of the coding scheme monitoring application 202. FIG. 2 describes the software architecture 200 for inferring intent and detecting label definition discrepancy in a dataset coding scheme. It should be recognized that the inferring intent and detecting label definition discrepancy is not limited to a dataset coding system. According to aspects of the present disclosure, the inferring intent and label definition discrepancy functionality is applicable to any type of event or user activity.

The coding scheme monitoring application 202 may be configured to call functions defined in a user space 204 that may, for example, provide for user activity and coding scheme monitoring services. The coding scheme monitoring application 202 may make a request for compiled program code associated with a library defined in a content analysis application programming interface (API) 206. The content analysis API 206 is configured to analyze a context associated with labeled content according to received data indicating how one or more individuals labeled the unstructured content according to a label coding scheme composed of a set of labels. In response, compiled code of a label discrepancy detection API 207 is configured to detect discrepancies of meaning for a particular label used by the one or more individuals and infer an intent of the one or more individuals, which may be presented to a user.

A run-time engine 208, which may be compiled code of a run-time framework, may be further accessible to the coding scheme monitoring application 202. The coding scheme monitoring application 202 may cause the run-time engine 208, for example, to take actions for inferring intent and label definition discrepancy in a dataset coding scheme. In response to detection of label definition discrepancy, the run-time engine 208 may in turn send a signal to an operating system 210, such as a Linux Kernel 212, running on the SOC 220. FIG. 2 illustrates the Linux Kernel 212 as software architecture for inferring intent and label definition discrepancy. It should be recognized, however, that aspects of the present disclosure are not limited to this exemplary software architecture. For example, other kernels may provide the software architecture to support inferring intent and label definition discrepancy functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Coding unstructured content (e.g., text, images, etc.) with labels is used in many different applications, and is a vital part for qualitative data analysis. Coding unstructured content generally involves humans for naming objects in images, identifying sounds in audio clips, detecting activities in video clips, and the like. Unfortunately, such conventional techniques are severely limited in that they ignore a great deal of human behavior and other such variables, such as uncertainties of human conduct, preferences, biases, and the like. In particular, relying on humans in the loop for coding results in the definitions of labels, which by their nature are very subjective. A large part of the subjectiveness is due to the differences of how people interpret the context based on their biases, expectations, etc., and how people take that in their thinking process.

Unfortunately, during dataset coding, the user may have certain assumptions regarding the labels they use. Such deficiencies may carry over into machine learning models trained using the labeled data, rendering these machine learning models deficient. Some aspects of the present disclosure are directed to utilizing machine learning to identify definitions of a label given by different individuals and the contextual factors that influence the labeling. In some aspects of the present disclosure, identifying label definitions and contextual factors is performed by analyzing the context in which the labels appear, and to predict the strategic thinking of the individuals that created the label. In these aspects of the present disclosure, a system may analyze content associated with a label (e.g., words for text content or pixels for image content). The system may measure a discrepancy of meanings for a label used by different individuals or by the same individual on different passes through the data. The system may also record metadata associated with how an individual labeled content (e.g., reaction time to assign a label, or whether a label was changed). In some aspects of the present disclosure, the dataset is recoded based on the recorded metadata.

Figure 3:
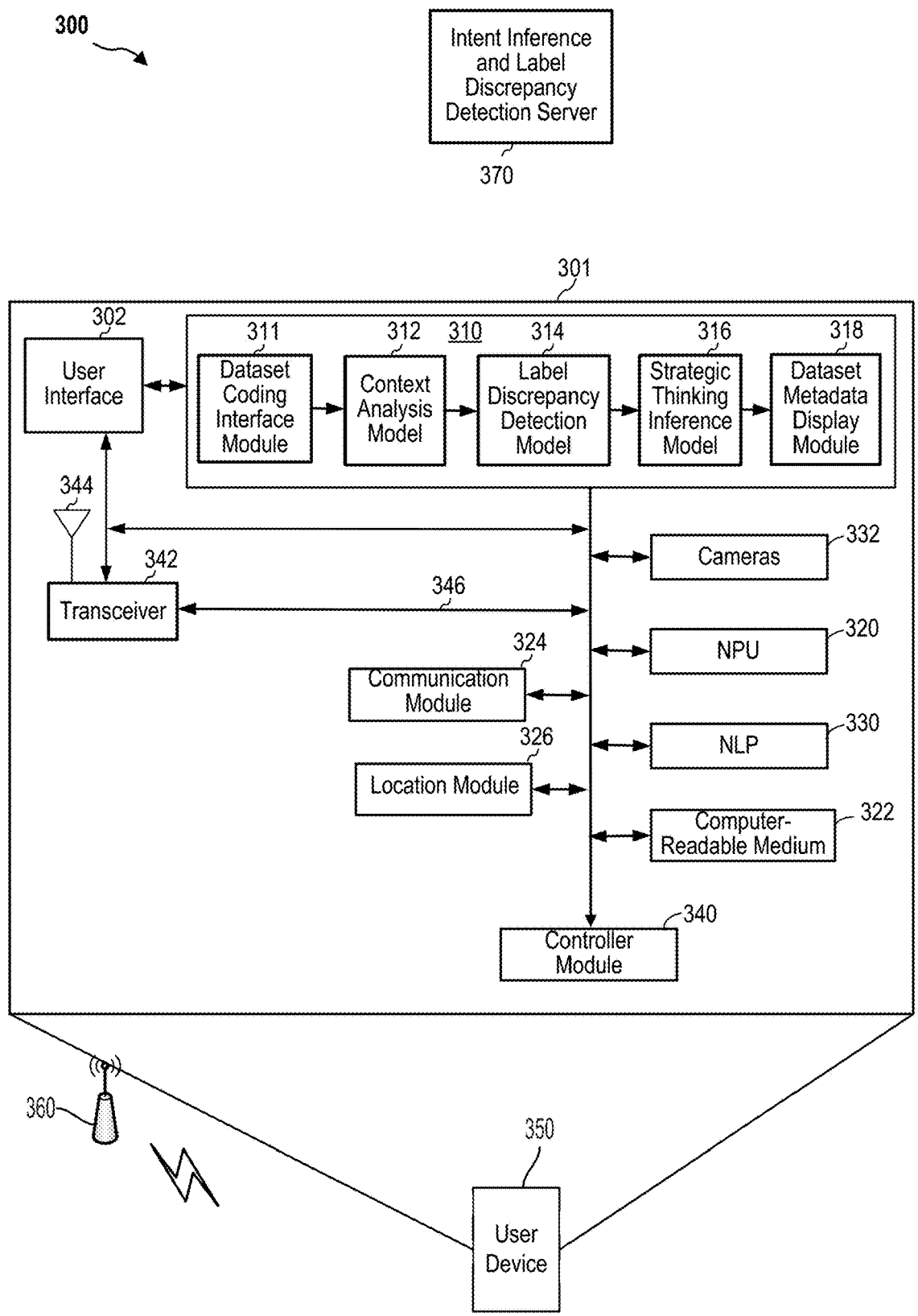
FIG. 3 is a diagram illustrating a hardware implementation for an intent inference and label discrepancy detection system for a dataset coding system, according to aspects of the present disclosure.

FIG. 3 is a diagram illustrating a hardware implementation for an intent inference and label discrepancy detection system 300 for a dataset coding scheme, according to aspects of the present disclosure. The intent inference and label discrepancy detection system 300 may be configured to utilize machine learning to identify discrepancies between definitions assigned to a label by different individuals and the contextual factors that influence the labeling. The intent inference and label discrepancy detection system 300 is configured to analyze a context associated with labeled content according to received data indicating how one or more individuals labeled the unstructured content according to a label coding scheme composed of a set of labels. In response, the intent inference and label discrepancy detection system 300 is configured to detect discrepancies of meaning for a particular label used by the one or more individuals and infers an intent of the one or more individuals, which may be presented to a user.

The intent inference and label discrepancy detection system 300 includes a coding scheme monitoring system 301 and an intent inference and label discrepancy detection server 370, in this aspect of the present disclosure. The coding scheme monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (e.g., smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The intent inference and label discrepancy detection server 370 may connect to the user device 350 for recording metadata associated with the strategic thinking and discrepancies of meaning detected between one or more individuals for dataset labels of a coded dataset. For example, the intent inference and label discrepancy detection server 370 may analyze a context associated with content labeled in a particular manner by the one or more individuals. The intent inference and label discrepancy detection server 370 may also include code to detect discrepancies of meaning for a particular label used by the one or more individuals. The intent inference and label discrepancy detection server 370 may infer a strategic thinking of the one or more individuals associated with discrepancies of meaning detected for the particular label. The intent inference and label discrepancy detection server 370 may also provide recorded metadata associated with the strategic thinking and discrepancies of meaning detected for the particular label between the one or more individuals to the user device 350 for display on the user interface 302 to a user.

The coding scheme monitoring system 301 may be implemented with an interconnected architecture, represented generally by an interconnect 346. The interconnect 346 may include any number of point-to-point interconnects, buses, and/or bridges depending on the specific application of the coding scheme monitoring system 301 and the overall design constraints. The interconnect 346 links together various circuits including one or more processors and/or hardware modules, represented by a user interface 302, a user activity module 310, a neural network processor (NPU) 320, a computer-readable medium 322, a communication module 324, a location module 326, a natural language processor (NLP) 330, cameras 332, and a controller module 340. The interconnect 346 may also link various other circuits such as timing sources, peripherals, voltage regulators, and power management circuits, which are well known in the art, and, therefore, will not be described any further.

The coding scheme monitoring system 301 includes a transceiver 342 coupled to the user interface 302, the user activity module 310, the NPU 320, the computer-readable medium 322, the communication module 324, the location module 326, the NLP 330, the cameras 332, and the controller module 340. The transceiver 342 is coupled to an antenna 344. The transceiver 342 communicates with various other devices over a transmission medium. For example, the transceiver 342 may receive commands via transmissions from a user or a connected device. In this example, the transceiver 342 may receive/transmit information for the user activity module 310 to/from connected devices within the vicinity of the user device 350.

The coding scheme monitoring system 301 includes the NPU 320 coupled to the computer-readable medium 322. The NPU 320 performs processing, including the execution of software stored on the computer-readable medium 322 to provide a neural network model for user monitoring and intent inference and label discrepancy detection functionality according to the present disclosure. The software, when executed by the NPU 320, causes the coding scheme monitoring system 301 to perform the various functions described for intent inference and label discrepancy detection through the user device 350, or any of the modules (e.g., 310, 324, 326, 330, 332, and/or 340). The computer-readable medium 322 may also be used for storing data that is manipulated by the NLP 330 when executing the software to analyze content or events viewed by the user, as captured by a first camera (fixed on the user) and a second camera fixed on the user's environment.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the autonomous vehicle 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the coding scheme monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The coding scheme monitoring system 301 also includes the NLP 330 to receive and analyze language and content labeled by the user for intent inference and label discrepancy detection. In some aspects of the present disclosure, the coding scheme monitoring system 301 may use natural language processing of the NLP 330 to determine a definition of content labeled by the user, which may be used to determine whether definition discrepancy of the same labels are detected. The NLP 330 may receive and analyze the dataset labeled by the user to infer the user's intent with coding a dataset with assigned labels.

The user activity module 310 may be in communication with the user interface 302, the NPU 320, the computer-readable medium 322, the communication module 324, the location module 326, the NLP 330, the controller module 340, and the transceiver 342. In one configuration, the user activity module 310 monitors viewed content from the user interface 302. The user interface 302 may monitor content viewed by the user to and from the communication module 324. According to aspects of the present disclosure, the NLP 330 may use natural language processing to extract definition regarding content labeled by the user, such as terms revealing that the user has a limited understanding of assigned labels.

As shown in FIG. 3, the user activity module 310 includes a dataset coding interface module 311, a context analysis model 312, a label discrepancy detection model 314, a strategic thinking inference model 316, and a dataset metadata display module 318. The context analysis model 312, the label discrepancy detection model 314, and the strategic thinking inference model 316 may be components of a same or different artificial neural network, such as a deep convolutional neural network (CNN). The context analysis model 312, the label discrepancy detection model 314, and the strategic thinking inference model 316 are not limited to a CNN. The dataset coding interface module 311 provides an interface (e.g., the user interface 302) to display content and enables received inputs to label the content. In some aspects of the present disclosure, an input label can be a discrete choice, a text input, a specified region, a view pattern generated by eye movements, or other label formats.

This configuration of the user activity module 310 includes the context analysis model 312 to generate contextual factors that influence a label by looking at the importance (e.g., weights or frequency) of fine-grained units of content associated with that label. For example, the fine-grained units of content may include words for text content or pixels for image content associated with that label. The context analysis model 312 could be domain specific (leverage pre-trained models focused on different domains and therefore support inference about different contexts).

The user activity module 310 also includes the label discrepancy detection model 314 to measure the discrepancies of meaning for a label given in different labeling passes conducted by an individual. For example, an individual can be inconsistent in what a label encompasses by changing a mental model or picking a different depth of details. Similarly, multiple people may be inconsistent in what a label encompasses. For example, two labelers or two groups of labelers may interpret a label with different biases. The label discrepancy detection model 314 can also measure the uncertainty for labeling content that referred to different labels in multiple labeling passes. For example, labels for a given text or bounded region of different image labels may be assigned (e.g., 90% apple, 7% peach, 3% orange).

The user activity module 310 also includes the strategic thinking inference model 316 to capture and record signals of strategic thinking or effort. For example, signals of strategic thinking may include a reaction time/time to label, whether the labeler revisits previously labeled content, whether the labeler changes the label, etc. Based on this information, the strategic thinking inference model 316 may infer the level of strategic thinking for an individual/group based on these signals. The strategic thinking inference model 316 may infer the level of strategic thinking based on the meanings and relationships of the labels generated from a specific individual/group's labeling behavior from the context analysis model 312 and the label discrepancy detection model 314.

Figure 4:
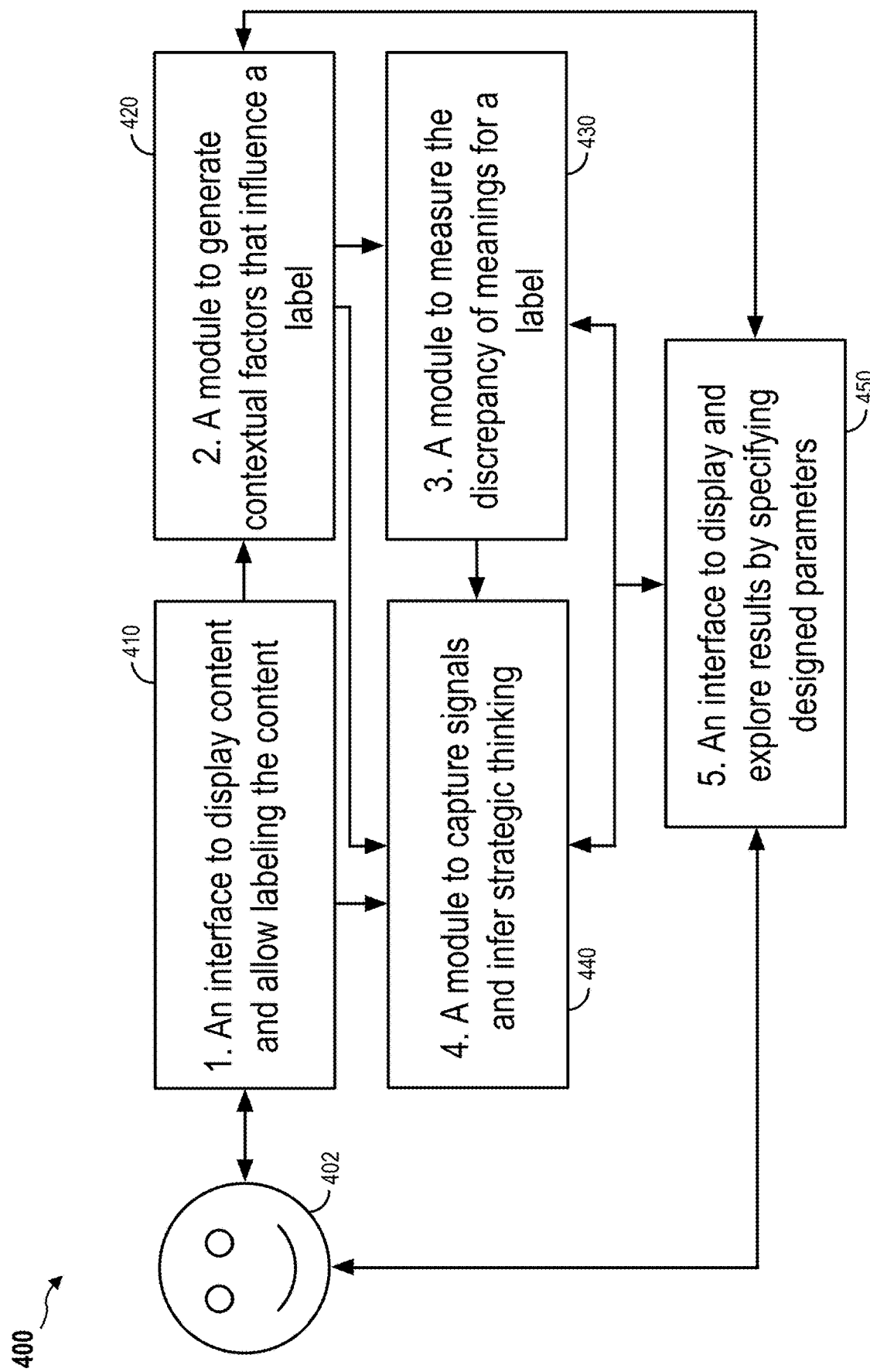
FIG. 4 is a block diagram illustrating an intent inference and label discrepancy detection system, in accordance with aspects of the present disclosure.

The user activity module 310 further includes the dataset metadata display module 318 to display the results (e.g., meanings, discrepancies of meanings, inference of strategic thinking). In addition, the dataset metadata display module 318 may enable specifying a designated individual/group/label/content, for example, as shown in FIG. 4. In some aspects of the present disclosure, the dataset metadata display module 318 may be implemented and/or work in conjunction with the intent inference and label discrepancy detection server 370.

FIG. 4 is a block diagram illustrating an intent inference and label discrepancy detection system 400, in accordance with aspects of the present disclosure. In some aspects of the present disclosure, the intent inference and label discrepancy detection system 400 utilizes machine learning to identify discrepancies between definitions assigned to a label by different individuals and the contextual factors that influence the labeling. The intent inference and label discrepancy detection system 400 is configured to analyze a context associated with labeled content according to received data indicating how different individuals labeled the unstructured content according to a coding scheme of assigning a set of labels. The intent inference and label discrepancy detection system 400 is configured to detect discrepancies of meaning for a particular label used by the individuals and infers an intent of the individuals.

In practice, coding unstructured content (e.g., text or images) with labels is used in many different applications, and is a significant part of qualitative data analysis. Unfortunately, coding unstructured content involves human labelers to perform the coding, and hence, the definitions of labels assigned by the human labelers are, by their nature, subjective. A large part of the subjectivity is due to the differences in how individuals interpret the context based on their biases, expectations, and personal experience. In aspects of the present disclosure, the intent inference and label discrepancy detection system 400 identifies discrepancies between definitions assigned to a label by different individuals and the contextual factors that influence the labeling.

For example, a label "range" applied to electrified vehicles can refer either to availability of charging stations or to distance to travel on full charge. An example regarding differences in context may include those who drive electric vehicles. These individuals generally have more concepts that refer to different issues related to "range." Another example regarding differences in a thinking process is, a person who leans toward System 1 type of thinking may look at some keywords to determine a label (e.g., when the keyword "charge" appears in the content, it would be labeled with "range"). Another person that leans toward System 2 type of thinking may think more beyond a keyword "charge" by looking for more relevant context (e.g., "distance," "traveling").

In this configuration, the intent inference and label discrepancy detection system 400 includes a user 402, a content display module 410, a contextual factor module 420, a label discrepancy module 430, a strategic thinking module 440, and a results display module 450. In some aspects of the present disclosure, the intent inference and label discrepancy detection system 400 uses machine learning approaches to 1) identify definitions of a label given by different individuals or groups and the contextual factors that influence the labeling by analyzing the other content with which the given label appears (e.g., what does a label "range" mean for a particular labeler), and 2) to predict the strategic thinking for these labelers (e.g., the labeling behavior of a specific person leans toward System 1 or another level of strategic thinking).

As shown at step 1, the intent inference and label discrepancy detection system 400 provides the content display module 410 to display content. In this example, the content display module 410 supports received inputs to label the displayed content. In some aspects of the present disclosure, an input label can be a discrete choice, a text input, a specified region, a view pattern generated by eye movements, or other label formats.

As shown at step 2, the intent inference and label discrepancy detection system 400 provides the contextual factor module 420 to generate contextual factors that influence a label by looking at the importance (e.g., weights or frequency) of fine-grained units of content associated with that label. For example, the fine-grained units of content may include words for text content or pixels for image content associated with that label. The contextual factor module 420 may be domain specific (leverage pre-trained models focused on different domains and therefore support inference about different contexts).

As shown at step 3, the intent inference and label discrepancy detection system 400 provides the label discrepancy module 430 to measure the discrepancies of meaning for a label given in different labeling passes conducted by an individual. For example, an individual can be inconsistent in what a label encompasses by changing a mental model or picking a different depth of details. Similarly, multiple people may be inconsistent in what a label encompasses. For example, two labelers or two groups of labelers may interpret a label with different biases. The label discrepancy module 430 can also measure the uncertainty for labeling content that referred to different labels in multiple labeling passes. For example, labels for a given text or bounded region of image different labels may be assigned (e.g., 90% truck, 7% SUV, 3% sedan).

As shown at step 4, the intent inference and label discrepancy detection system 400 provides the strategic thinking module 440 to capture and record signals of strategic thinking or effort. For example, signals of strategic thinking may include a reaction time/time to label, whether the labeler revisits previously labeled content, whether the labeler changes the label, etc. Based on this information, the strategic thinking module 440 may infer the level of strategic thinking for an individual/group based on these signals. The strategic thinking module 440 may infer the level of strategic thinking based on the meanings and relationships of the labels generated from a specific individual/group's labeling behavior from the contextual factor module 420 and the label discrepancy module 430.

As shown at step 5, the intent inference and label discrepancy detection system 400 provides the results display module 450 to display the results (e.g., meanings, discrepancies of meanings, inference of strategic thinking). In addition, the dataset metadata display module 318 of FIG. 3 may enable specifying a designated individual/group/label/content. The intent inference and label discrepancy detection system 400 may engage in a process, for example, as shown in FIG. 5.

Figure 5:
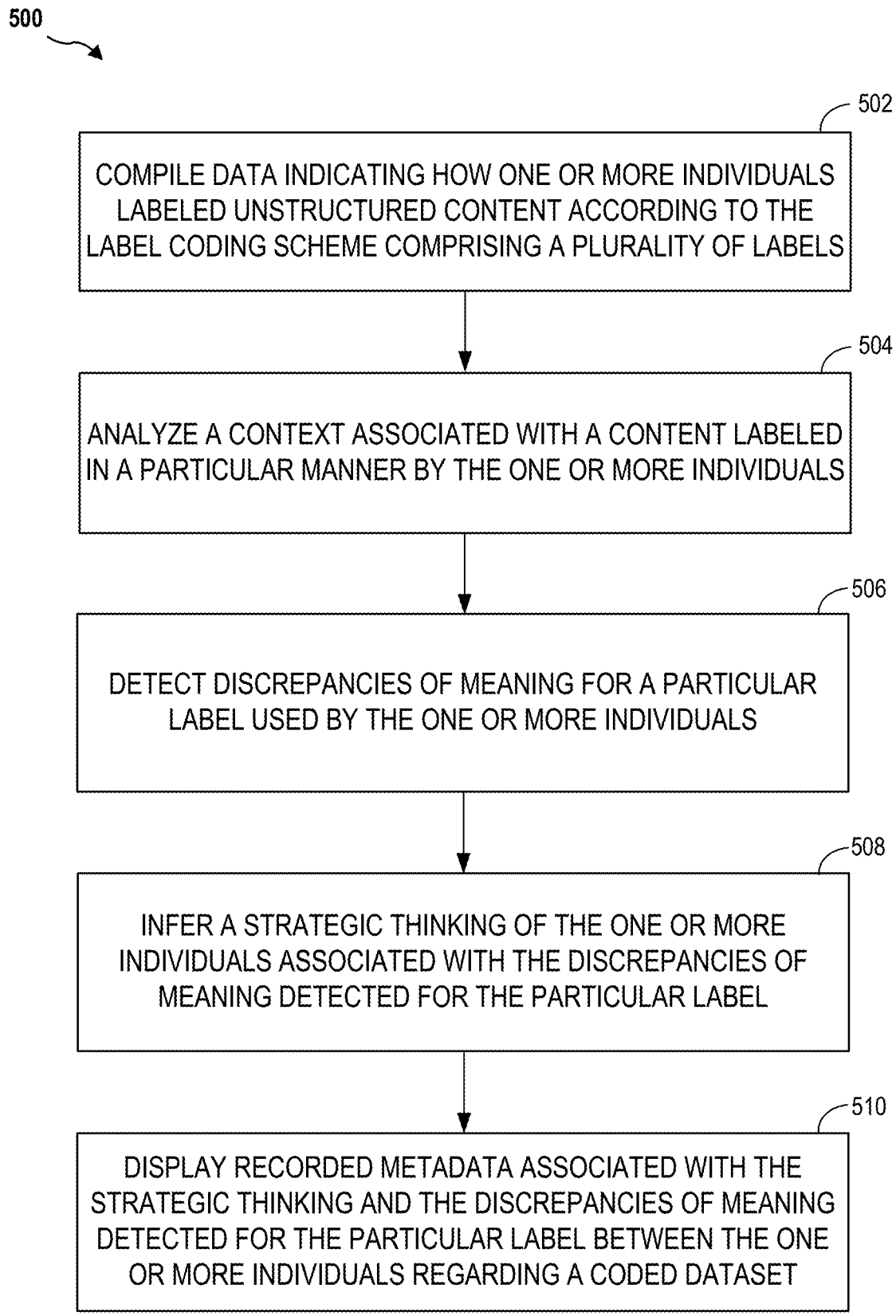
FIG. 5 is a flowchart illustrating a method for inferring intent and discrepancies in a label coding scheme, according to aspects of the present disclosure.

FIG. 5 is a flowchart illustrating a method for inferring intent and discrepancies in a label coding scheme, according to aspects of the present disclosure. A method 500 of FIG. 5 begins at block 502, in which data is compiled indicating how one or more individuals labeled unstructured content according to the label coding scheme comprising a plurality of labels. For example, as described in FIG. 4, at step 1 the intent inference and label discrepancy detection system 400 provides the content display module 410 to display content. In this example, the content display module 410 supports received inputs to label the displayed content. In some aspects of the present disclosure, an input label can be a discrete choice, a text input, a specified region, a view pattern generated by eye movements, or other label formats.

Referring again to FIG. 5, at block 504, a context associated with a content labeled in a particular manner by the one or more individuals is analyzed. For example, as shown in FIG. 4 at step 2, the intent inference and label discrepancy detection system 400 provides the contextual factor module 420 to generate contextual factors that influence a label by looking at the importance (e.g., weights or frequency) of fine-grained units of content associated with that label. For example, the fine-grained units of content may include words for text content or pixels for image content associated with that label. The contextual factor module 420 may be domain specific (leverage pre-trained models focused on different domains and therefore support inference about different contexts).

At block 506, discrepancies of meaning are detected for a particular label used by the one or more individuals. For example, as shown in FIG. 4, at step 3, the label discrepancy module 430 measures the discrepancies of meaning for a label given in different labeling passes conducted by an individual. For example, an individual can be inconsistent in what a label encompasses by changing a mental model or picking a different depth of details. Similarly, multiple people may be inconsistent in what a label encompasses. For example, two labelers or two groups of labelers may interpret a label with different biases. The label discrepancy module 430 can also measure the uncertainty for labeling content that referred to different labels in multiple labeling passes. For example, labels for a given text or bounded region of different image labels may be assigned (e.g., 90% truck, 7% SUV, 3% sedan).

At block 508, a strategic thinking is inferred for the one or more individuals associated with the discrepancies of meaning detected for the particular label. For example, as shown in FIG. 4 at step 4, the strategic thinking module 440 captures and records signals of strategic thinking or effort. For example, signals of strategic thinking may include a reaction time/time to label, whether the labeler revisits previously labeled content, whether the labeler changes the label, etc. Based on this information, the strategic thinking module 440 may infer the level of strategic thinking for an individual/group based on these signals. The strategic thinking module 440 may infer the level of strategic thinking based on the meanings and relationships of the labels generated from a specific individual/group's labeling behavior from the contextual factor module 420 and the label discrepancy module 430.

At block 510, recorded metadata is displayed regarding the strategic thinking and the discrepancies of meaning detected for the particular label between the one or more individuals regarding a coded dataset. For example, as shown in FIG. 4 at step 5, the intent inference and label discrepancy detection system 400 provides the results display module 450 to display the results (e.g., meanings, discrepancies of meanings, inference of strategic thinking). In addition, the dataset metadata display module 318 may enable specifying a designated individual/group/label/content.

The method 500, further includes re-coding the coded dataset to resolve at least the discrepancies of meaning detected for labels of the coded dataset. The method 500 also compiles data by providing a dataset coding interface to enable one or more individuals to label the unstructured content according to the label coding scheme. The method 500 detects discrepancies by measuring discrepancies of meaning for the particular label used by the one or more individuals. The method 500 also detects discrepancies by identifying, using a machine learning model, the discrepancies of meaning for the particular label used by the one or more individuals. The method 500 also detects the discrepancies of meaning by measuring an uncertainty for labeling the content when different labels are assigned in multiple labeling passes.

The method 500 further infers the strategic thinking by measuring a reaction time to label. The method 500 also includes determining whether a labeler revisits previously labeled content. The method 500 also includes determining whether the labeler changed the label. The method 500 also includes capturing and recording signals of the reaction time, a number of labeler revisits, and a number of label changes. The method 500 also includes inferring a level of the strategic thinking for an individual/group based on the recorded signals. The method 500 analyzes the context by determining weights and/or frequencies of fine-grained units of the content associated with labels using pre-trained models focused on different domains to support inference about different contexts. The method 500 also includes identifying contextual factors that influence labels associated with the content according to the determined weights and/or the frequencies.

Some aspects of the present disclosure are directed to utilizing machine learning to identify definitions of a label given by different individuals and the contextual factors that influence the labeling. In some aspects of the present disclosure, identifying label definitions and contextual factors is performed by analyzing the context in which the labels appears, and to predict the strategic thinking of the individuals that created the label. In these aspects of the present disclosure, a system may analyze content associated with a label (e.g., words for text content or pixels for image content). The system may measure a discrepancy of meanings for a label used by different individuals or by the same individual on different passes through the data. The system may also record metadata associated with how an individual labeled content (e.g., reaction time to assign a label, or whether a label was changed). In some aspects of the present disclosure, the dataset is recoded based on the recorded metadata.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for inferring intent and discrepancies in a label coding scheme, the method comprising:
compiling data indicating how one or more individuals labeled unstructured content according to the label coding scheme comprising a plurality of labels;
analyzing a context associated with a content labeled in a particular manner by the one or more individuals;
detecting discrepancies of meaning for a particular label used by the one or more individuals;
inferring a strategic thinking of the one or more individuals associated with the discrepancies of meaning detected for the particular label; and
displaying recorded metadata associated with the strategic thinking and the discrepancies of meaning detected for the particular label between the one or more individuals regarding a coded dataset.

2. The method of claim 1, further comprising re-coding the coded dataset to resolve at least the discrepancies of meaning detected for labels of the coded dataset.

3. The method of claim 1, in which the compiling data comprises providing a dataset coding interface to enable the one or more individuals to label the unstructured content according to the label coding scheme.

4. The method of claim 1, in which the detecting discrepancies further comprises measuring discrepancies of meaning for the particular label used by the one or more individuals.

5. The method of claim 1, in which the detecting discrepancies comprises identifying, using a machine learning model, the discrepancies of meaning for the particular label used by the one or more individuals.

6. The method of claim 1, in which inferring the strategic thinking comprises:
measuring a reaction time to label;
determining whether a labeler revisits previously labeled content;
determining whether the labeler changed the label;
capturing and recording signals of the reaction time, a number of labeler revisits, and a number of label changes; and
inferring a level of the strategic thinking for an individual/group based on recording the signals.

7. The method of claim 1, in which analyzing the context comprises:
determining weights and/or frequencies of fine-grained units of the content associated with labels using pre-trained models focused on different domains to support inference about different contexts; and
identifying contextual factors that influence the labels associated with the content according to the determined weights and/or the frequencies.

8. The method of claim 1, in which the detecting discrepancies of meaning comprises measuring an uncertainty for labeling the content when different labels are assigned in multiple labeling passes.

9. A non-transitory computer-readable medium having program code recorded thereon for inferring intent and discrepancies in a label coding scheme, the program code being executed by a processor and comprising:
program code to compile data indicating how one or more individuals labeled unstructured content according to the label coding scheme comprising a plurality of labels;
program code to analyze a context associated with a content labeled in a particular manner by the one or more individuals;
program code to detect the discrepancies of meaning for a particular label used by the one or more individuals;
program code to infer a strategic thinking of the one or more individuals associated with the discrepancies of meaning detected for the particular label; and
program code to display recorded metadata associated with the strategic thinking and the discrepancies of meaning detected for the particular label between the one or more individuals regarding a coded dataset.

10. The non-transitory computer-readable medium of claim 9, further comprising program code to re-code the coded dataset to resolve at least the discrepancies of meaning detected for labels of the coded dataset.

11. The non-transitory computer-readable medium of claim 9, in which the program code to compile data comprises program code to provide a dataset coding interface to enable the one or more individuals to label the unstructured content according to the label coding scheme.

12. The non-transitory computer-readable medium of claim 9, in which the program code to detect the discrepancies further comprises program code to measure discrepancies of meaning for the particular label used by the one or more individuals.

13. The non-transitory computer-readable medium of claim 9, in which the program code to detect discrepancies comprises program code to identify, using a machine learning model, the discrepancies of meaning for the particular label used by the one or more individuals.

14. The non-transitory computer-readable medium of claim 9, in which the program code to infer the strategic thinking comprises:
program code to measure a reaction time to label;
program code to determine whether a labeler revisits previously labeled content;
program code to determine whether the labeler changed the label;
program code to capture and record signals of the reaction time, a number of labeler revisits, and a number of label changes; and
program code to infer a level of the strategic thinking for an individual/group based on recording the signals.

15. The non-transitory computer-readable medium of claim 9, in which the program code to analyze the context comprises:
program code to determine weights and/or frequencies of fine-grained units of the content associated with labels using pre-trained models focused on different domains to support inference about different contexts; and
program code to identify contextual factors that influence the labels associated with the content according to the determined weights and/or the frequencies.

16. The non-transitory computer-readable medium of claim 9, in which the program code to detect discrepancies of meaning comprises program code to measure an uncertainty for labeling the content when different labels are assigned in multiple labeling passes.

17. A system for inferring intent and discrepancies in a label coding scheme, the system comprising:
a dataset coding interface to compile data indicating how one or more individuals labeled unstructured content according to the label coding scheme comprising a plurality of labels;

a context analysis model to analyze a context associated with content labeled in a particular manner by the one or more individuals;

a label discrepancy model to detect the discrepancies of meaning for a particular label used by the one or more individuals;

a strategic thinking inference model to infer a strategic thinking of the one or more individuals associated with the discrepancies of meaning detected for the particular label; and an interactive user interface of a user device to display recorded metadata associated with the strategic thinking and the discrepancies of meaning detected for the particular label between the one or more individuals in response to user specified design parameters.

18. The system of claim 17, in which the label discrepancy detection model is further to measure discrepancies of meaning for the particular label used by the one or more individuals.

19. The system of claim 17, in which the label discrepancy detection model is further identify the discrepancies of meaning for the particular label used by the one or more individuals.

20. The system of claim 17, in which the label discrepancy detection model is further to measure an uncertainty for labeling the content when different labels are assigned in multiple labeling passes.

* * * * *